US007198407B2

(12) United States Patent
Iiya et al.

(10) Patent No.: US 7,198,407 B2
(45) Date of Patent: Apr. 3, 2007

(54) BEARING ASSEMBLY WITH ROTATIONAL SPEED SENSOR UNIT

(75) Inventors: Takatoshi Iiya, Iwata (JP); Syougo Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 68 days.

(21) Appl. No.: 11/065,104

(22) Filed: Feb. 25, 2005

(65) Prior Publication Data

US 2005/0185868 A1 Aug. 25, 2005

(51) Int. Cl.
*F16C 19/08* (2006.01)

(52) U.S. Cl. .................................................... 384/448

(58) Field of Classification Search ................ 384/448, 384/446, 544; 324/174, 173
See application file for complete search history.

(56) References Cited

U.S. PATENT DOCUMENTS 7,034,521 B2 * 4/2006 Sentoku et al. ............. 324/174
2004/0013334 A1 * 1/2004 Landrieve et al. .......... 384/448

FOREIGN PATENT DOCUMENTS

JP 6-308145 11/1994

* cited by examiner

*Primary Examiner*—Lenard A. Footland
(74) *Attorney, Agent, or Firm*—Wenderoth, Lind & Ponack, L.L.P.

(57) ABSTRACT

A bearing assembly carrying a rotational speed sensor unit is proposed. The sensor unit includes a sensor holder mounted on the outer member of the bearing assembly and having a pocket in which is received the sensor. The pocket has a clip portion which, with the sensor fully inserted in the pocket, elastically engages the sensor to press it against the end of the outer member. The pocket has a bottom frame at its bottom or a front wall having a bottom edge. With the sensor fully inserted in the pocket, the bottom frame or the bottom edge of the front wall is configured to abut the bottom end of the front side of the sensor, thereby keeping the sensor from inclining backward even if it is pushed backward at its upper portion. This prevents the sensor from disengaging from the pocket in a radial direction of the bearing.

3 Claims, 6 Drawing Sheets

BEARING ASSEMBLY WITH ROTATIONAL SPEED SENSOR UNIT

BACKGROUND OF THE INVENTION

This invention relates to a bearing assembly carrying a rotational speed sensor unit for sensing the rotational speed of e.g. a wheel of a vehicle.

Today's vehicles are equipped with a variety of increasingly sophisticated control systems, including anti-lock brake systems (ABS), which control the braking forces to individual wheels during hard braking to prevent lock-up of any wheel or wheels, traction control systems, which control the drive wheels to prevent either of them from slipping while the vehicle is accelerating, and car navigation systems. All of these systems require rotational speed sensor units for accurately measuring the rotational speeds of the wheels. Today, bearing assemblies including such rotational speed sensor units are becoming increasingly popular.

Unexamined JP patent publication 6-308145 discloses such a bearing assembly.

This bearing assembly is shown in FIG. 6. It comprises an outer member 2 having two raceways on the radially inner surface thereof, an inner member 3 having two raceways each radially opposing one of the raceways of the outer member, two rows of rolling elements, each row being disposed between one of the two pairs of radially opposed raceways, and a sensor unit. The sensor unit comprises a pulse generator 8 mounted on the inner member 3, which is rotational, and a sensor 12 mounted on the stationary outer member 2 so as to oppose the pulse generator 8.

The sensor 12 is inserted into and clipped on an annular sensor holder 6 fitted on the outer periphery of the outer member 2 near its inboard end.

The sensor holder 6 comprises a ring portion 7 fitted on the outer periphery of the outer member 2 near its inboard end, and a frame-shaped pocket 9 into which the head of the sensor 12 is inserted.

The pocket 9 includes guide portions 9*a* adapted to engage in guide grooves 12*a* formed in the side walls of the head of the sensor 12, and an elastic clip portion 9*b* adapted to engage in an engaging groove 12*b* formed in the front side of the sensor head. The head of the sensor 12 can thus be clipped on the sensor holder 6 utilizing the elasticity of the clip portion 9*b*. With the sensor head clipped on the sensor holder 6, the elastic clip portion 9*b* keeps the sensor 12 from disengaging from the pocket 9 in a radial direction of the inner and outer members, as long as the clip portion 9*b* is engaged in the engaging groove 12*b*, which extends across the center of the front side of the sensor 12.

But if a force indicated by the letter F in FIG. 7 is applied to the upper portion of the sensor 12, the sensor 12 will pivot counterclockwise (in FIGS. 6 and 7) from its upright position (FIG. 6) to the position shown in FIG. 7, thereby pushing the clip portion 9*b* out of the groove 12*b*. In this state, the clip portion 9*b* cannot rigidly hold the sensor 12 any more, so that the sensor 12 tends to disengage from the pocket 9 in a radial direction of the bearing inner and outer members.

An object of the invention is to provide such a sensor unit with means for keeping the sensor rigidly and stably held in the sensor holder by positively preventing the sensor from disengaging from the sensor holder in a radial direction of the bearing inner and outer members.

SUMMARY OF THE INVENTION

According to the present invention, there is provided a bearing assembly comprising an outer member formed with two raceways on its inner periphery, an inner member formed with two raceways each radially opposing one of the raceways formed on the outer member, two rows of rolling elements, each row of the rolling elements being disposed between one of the two pairs of radially opposed raceways, and a rotational speed sensor unit. One, of the outer member and the inner member is a stationary member and the other of the outer member and the inner member is a rotary member. The rotational speed sensor unit comprises a pulse generator mounted on the rotary member, a sensor holder having a pocket and mounted on the stationary member at one end thereof, and a sensor received in the pocket of the sensor holder. The sensor has a backside facing the pulse generator and the one end of the stationary member, and a front side, the pocket of the sensor holder including a clip portion that pushes a central portion of the front side of the sensor, thereby pressing the backside of the sensor against the one end of the stationary member. The pocket of the sensor holder further includes a sensor inclination preventive arrangement that abuts a bottom end of the front side of the sensor when the sensor is fully inserted in the pocket, thereby preventing the sensor from inclining in such a direction that its top end pivots toward (in the direction of) the backside of the sensor.

The sensor inclination preventive arrangement may comprise a bottom frame provided at a bottom portion of the pocket of the sensor holder. The bottom frame is configured to abut the bottom end of the front side of the sensor when the sensor is fully inserted in the pocket of the sensor holder, or may be a front wall of the pocket of the sensor holder. The front wall has a bottom edge configured to abut the bottom end of the front side of the sensor when the sensor is fully inserted in the pocket.

The sensor inclination preventive arrangement keeps the sensor from inclining backward even if the sensor is pushed backwardly at its upper portion, thus preventing the clip portion from being pushed out of the engaging groove formed in the sensor. This positively prevents the sensor from disengaging from the pocket of the sensor in a radial direction of the bearing. The entire device thus operates reliably.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
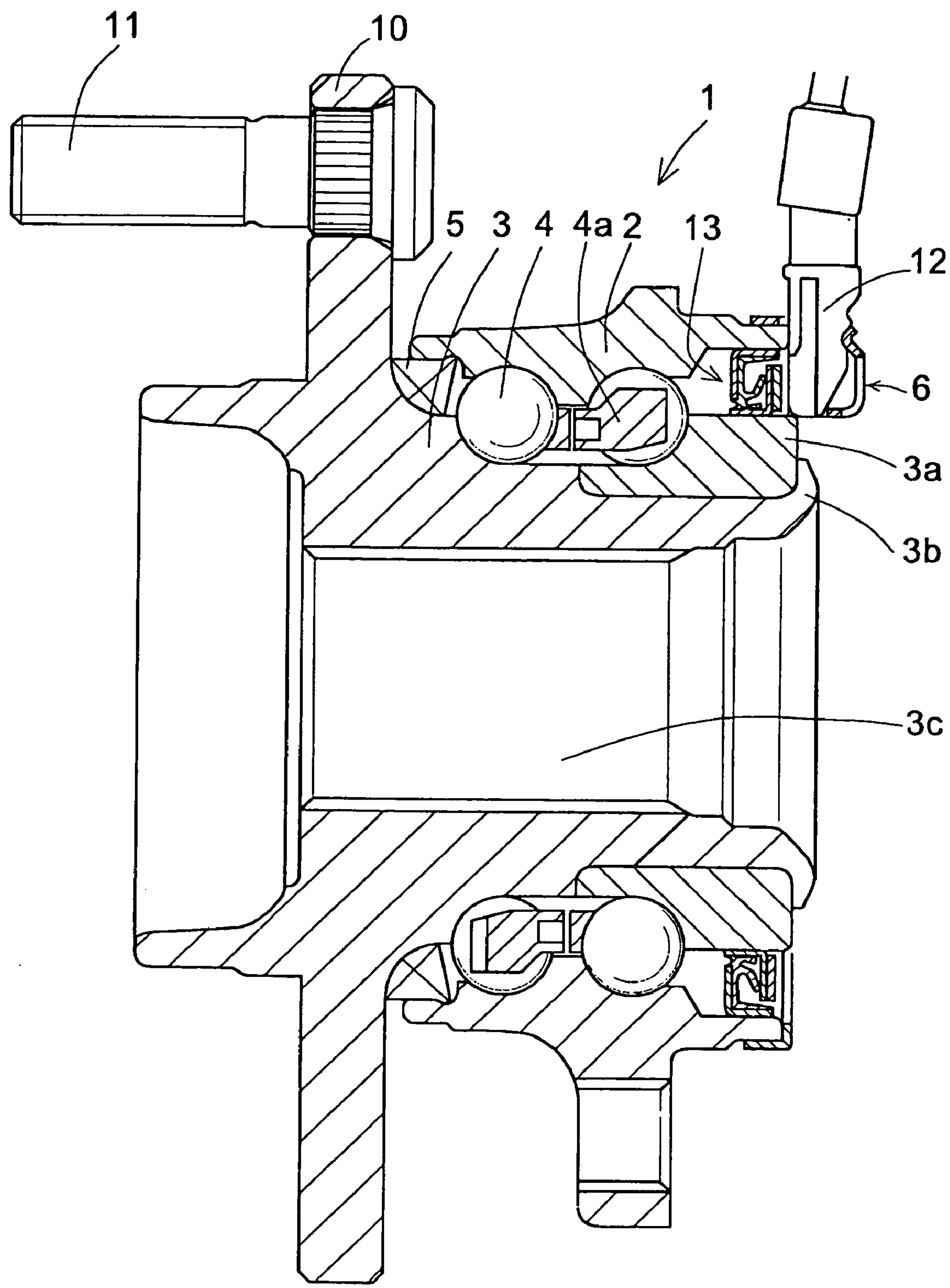
FIG. 1 is a front view in vertical section of a bearing assembly according to a first embodiment of the present invention.
Figure 2:
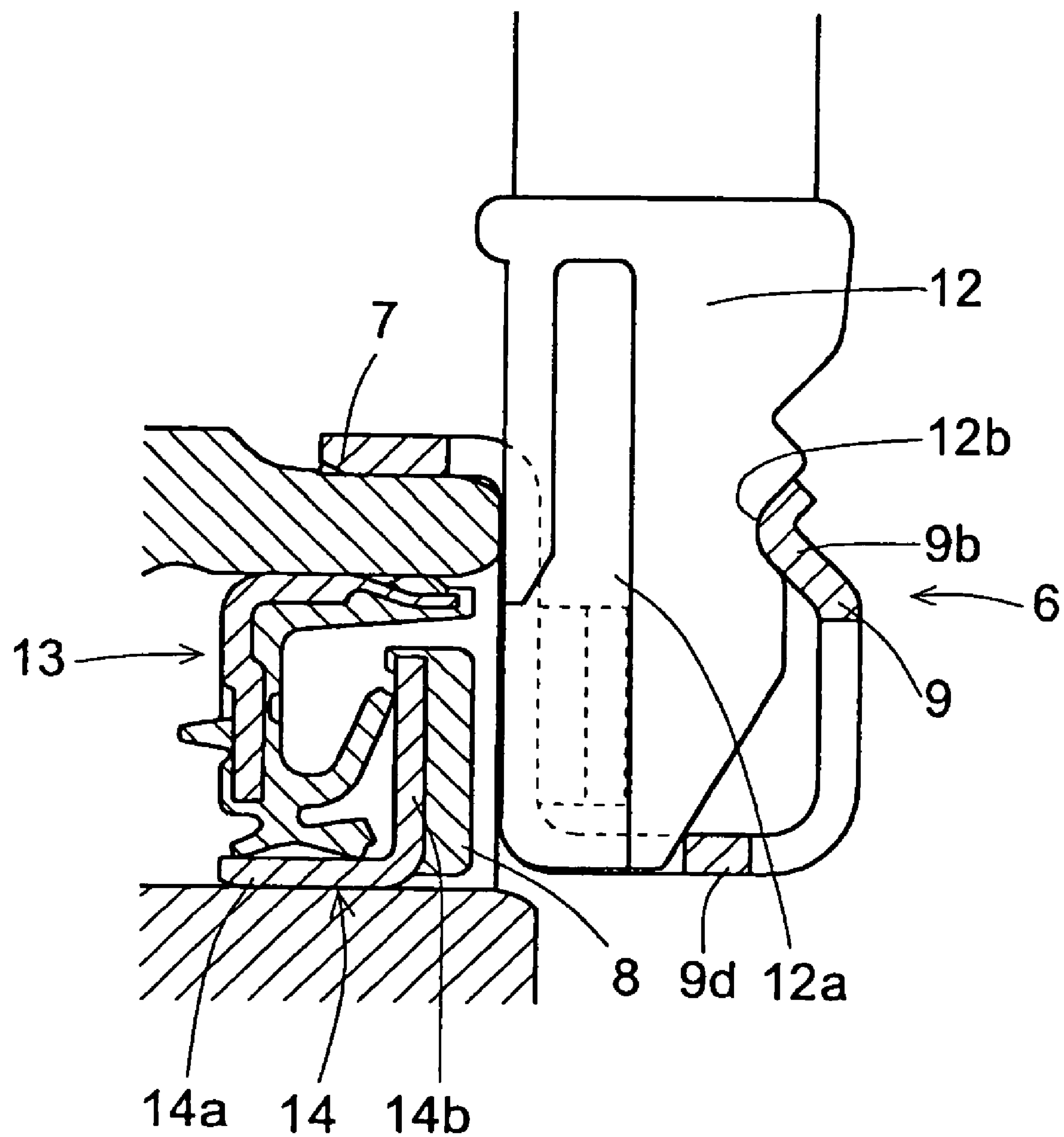
FIG. 2 is a front view in vertical section of a portion of the first embodiment, showing the pocket of the sensor holder thereof.
Figure 3:
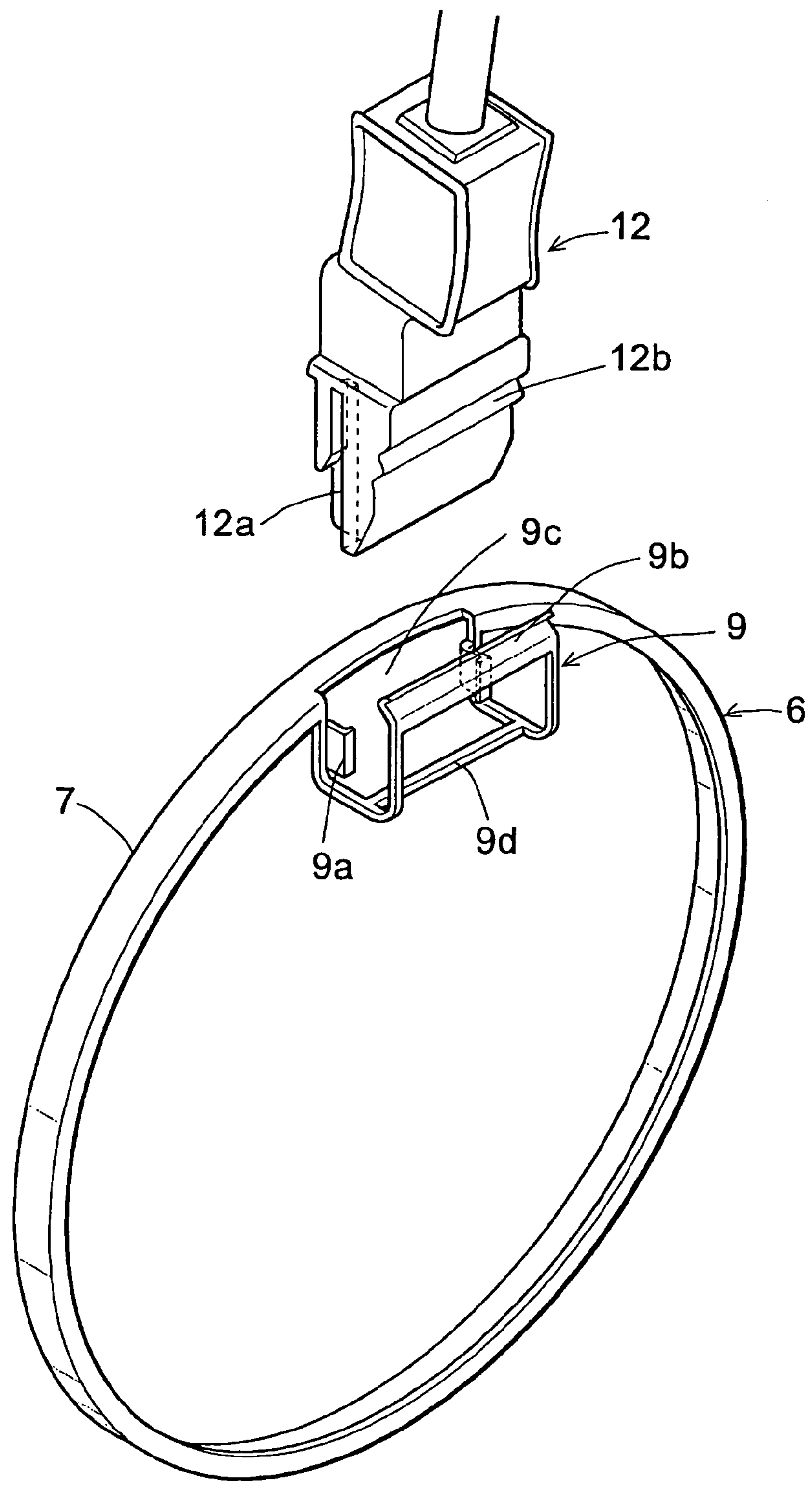
FIG. 3 is a perspective view of the sensor holder and the sensor of the same, showing how the head of the sensor is inserted into the pocket of the sensor holder.

FIGS. 1–3 show a wheel bearing assembly 1 embodying the invention for supporting a drive wheel of a vehicle. It includes an outer member 2 having two parallel raceways on the radially inner surface thereof, and an inner member 3 comprising a main body (not numbered) formed with a raceway radially opposing one of the raceways of the outer member 2 and a separate inner ring 3*a* formed with a raceway radially opposing the other of the raceways of the outer member 2. A plurality of rolling elements 4 are disposed between each of the two pairs of radially opposed raceways. The rolling elements 4 are held by a retainer 4*a*. The outer member 2 and the inner member 3 are rotatable relative to each other. The inner member 3 is formed with a bore 3*c* through which an axle of a vehicle is adapted to be inserted. The space between the inner and outer members 3 and 2 is sealed at its outboard end by an elastic seal 5 and at its inboard end by a seal member 13. The outer member 2 carries at its inboard end an annular sensor holder 6 on which a sensor 12 is adapted to be mounted.

A wheel mounting flange 10 protrudes radially outwardly from the radially outer surface of the main body of the inner member 3 near its outboard end. A wheel (not shown) of the vehicle is adapted to be mounted on the flange 10 by means of hub bolts 11 (only one is shown). The outer member 2 is adapted to be secured to a suspension (not shown) of the vehicle. The main body of the inner member 3 has its inboard end 3*b* secured to the inboard end of the inner ring 3*a* by caulking the inboard end 3*b*, thereby imparting a preload to the rolling elements 4.

The wheel bearing assembly 1 includes a rotational speed sensor unit comprising a pulse generator 8 (FIG. 2) mounted on an annular fixture 14 fitted on the inner ring 3*a* near its inboard end, and the sensor 12 mounted to the outer member 2 through the sensor holder 6 so as to oppose the pulse generator 8.

The annular fixture 14 is formed by pressing a steel sheet and comprises a cylindrical portion 14*a* pressed on the outer periphery of the inner ring 3*a* near its inboard end so as to be stationary relative to the inner ring 3*a*, and an annular portion 14*b* radially outwardly extending from the inboard end of the cylindrical portion 14*a*. The pulse generator 8 is mounted on the inboard side of the annular portion 14*b*.

The pulse generator 8 may be a rubber magnet, a rolled magnet or a sintered magnet having a plurality of circumferentially alternating North and South poles, or a magnetic member formed with a plurality of circumferentially arranged windows or cutouts.

The sensor 12 has a head formed with a guide groove 12*a* in either side wall thereof, and an engaging groove 12*b* in its front side, as shown in FIG. 3.

The sensor holder 6 is made of a nonmagnetic stainless steel (such as SUS304), and comprises a ring portion 7 fitted on the outer surface of the outer member 2 near its inboard end, and a frame-shaped pocket 9 for receiving the head of the sensor 12.

In its backside, the pocket 9 defines a window 9*c* that faces the pulse generator 8. The pocket 9 includes guide portions 9*a* adapted to engage in the guide grooves 12*a* formed in the head of the sensor 12, and a clip portion 9*b* having elasticity and adapted to engage in the groove 12*b* formed in the front side of the head of the sensor 12.

The pocket 9 further includes a bottom frame 9*d* at its bottom which is configured to abut and support the bottom end of the front side of the sensor head when the sensor head is fully inserted in the pocket 9. Thus, with the head of the sensor 12 fully inserted in the pocket 9, the bottom frame 9*d* prevents the sensor 12 from inclining such that its top end pivots backward even if the sensor 12 is pushed in this direction at the upper portion of its front side. This prevents the elastic clip portion 9*b* from being pushed out of the engaging groove 12*b*, which in turn prevents the sensor 12 from disengaging from the pocket 9.

Figure 4A:
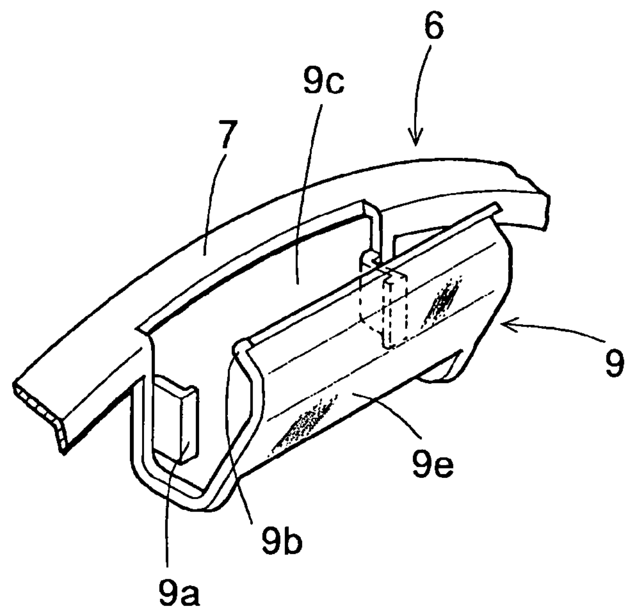
FIG. 4A is a perspective view of a sensor holder of a second embodiment, showing its pocket.
Figure 4B:
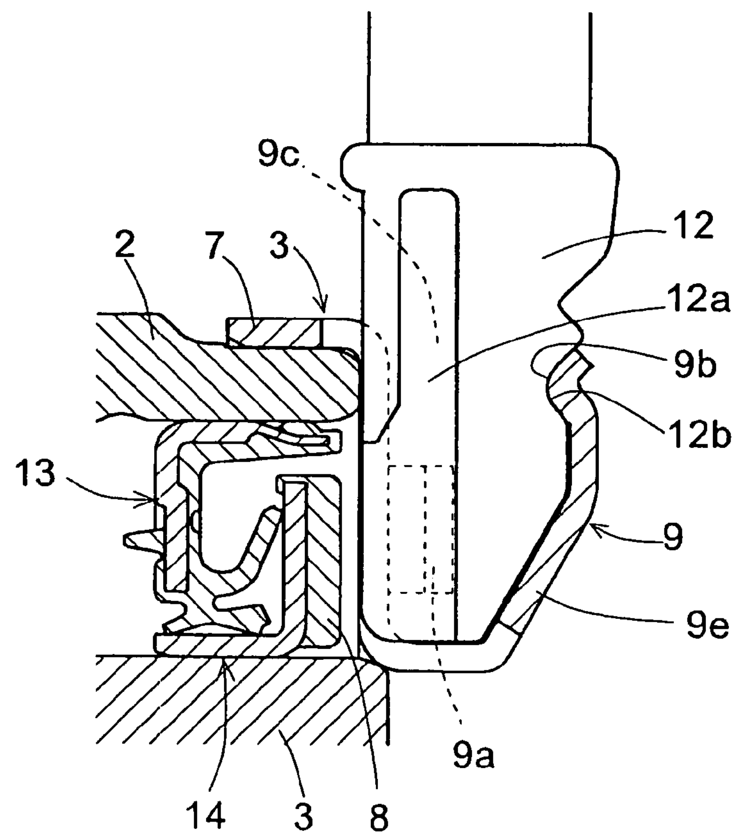
FIG. 4B is a front view in vertical section of the pocket of the sensor holder of FIG. 4A, with the sensor received therein.

FIGS. 4A and 4B show the second embodiment, in which the pocket 9 has a front wall 9*e* having its bottom edge positioned and shaped so as to come into close contact with the bottom end of the front side of the sensor head when the sensor head is fully inserted into the pocket 9. Thus, like the bottom frame 9*d* of the first embodiment, the front wall 9*e* prevents the sensor 12 from inclining such that its top end pivots backward even if its top end is pushed backward.

Figure 5A:
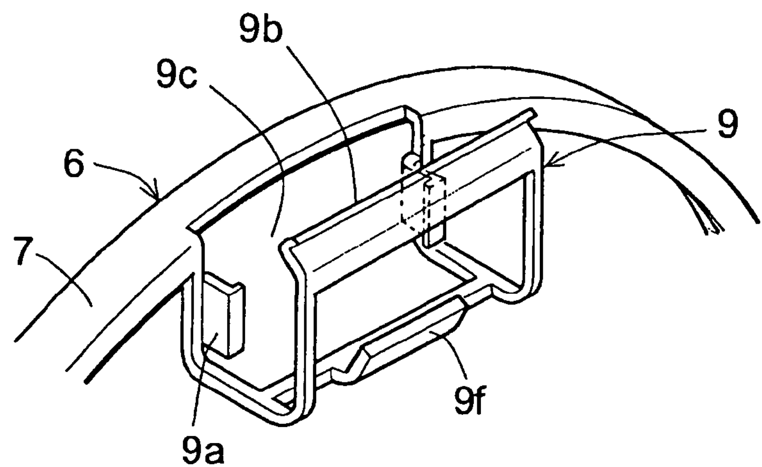
FIG. 5A is a perspective view of a sensor holder of a third embodiment, showing its pocket.
Figure 5B:
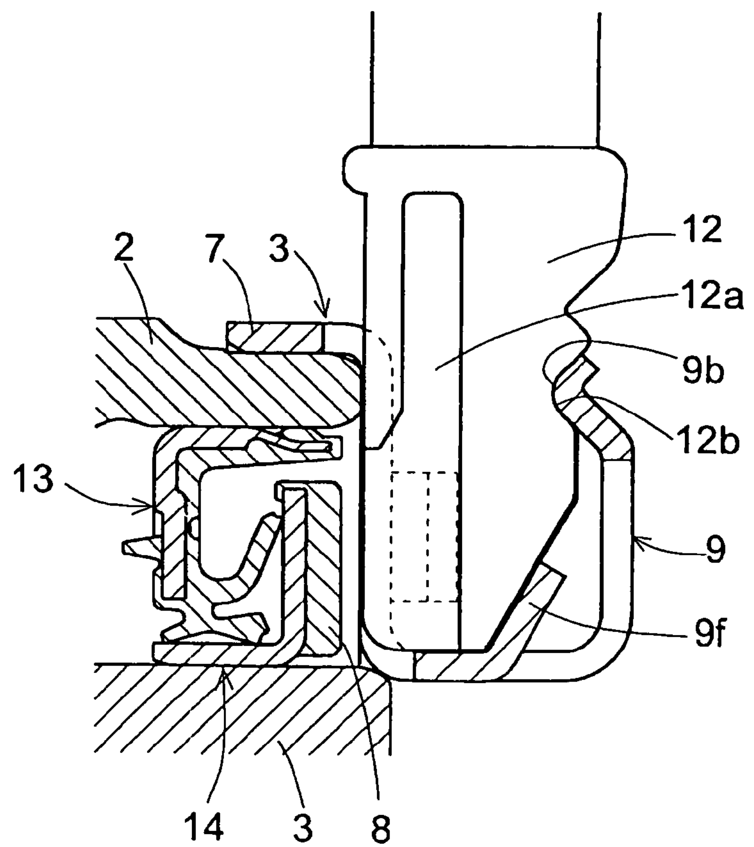
FIG. 5B is a front view in vertical section of the pocket of the sensor holder of FIG. 5A, with the sensor received therein.
Figure 6:
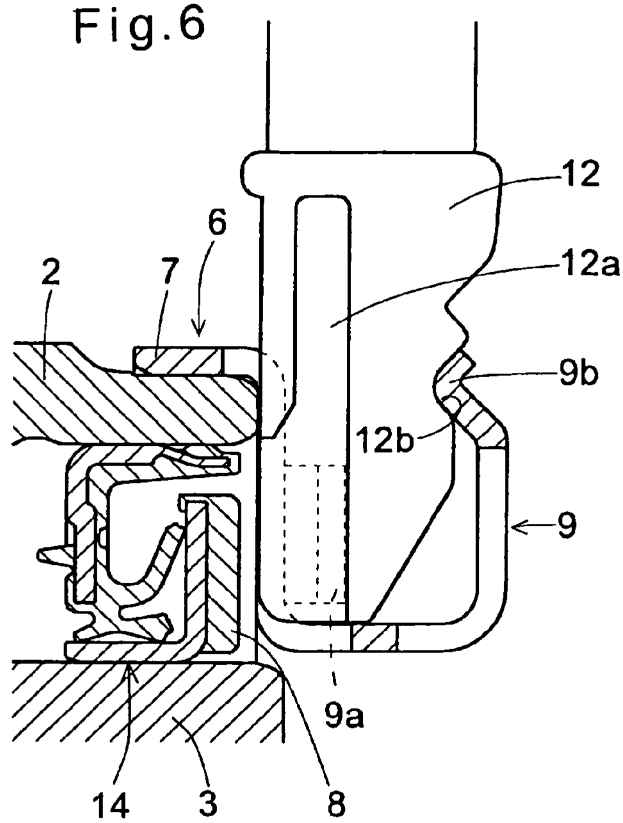
FIG. 6 is a front view in vertical section of a pocket of a conventional sensor holder, with the sensor received therein.
Figure 7:
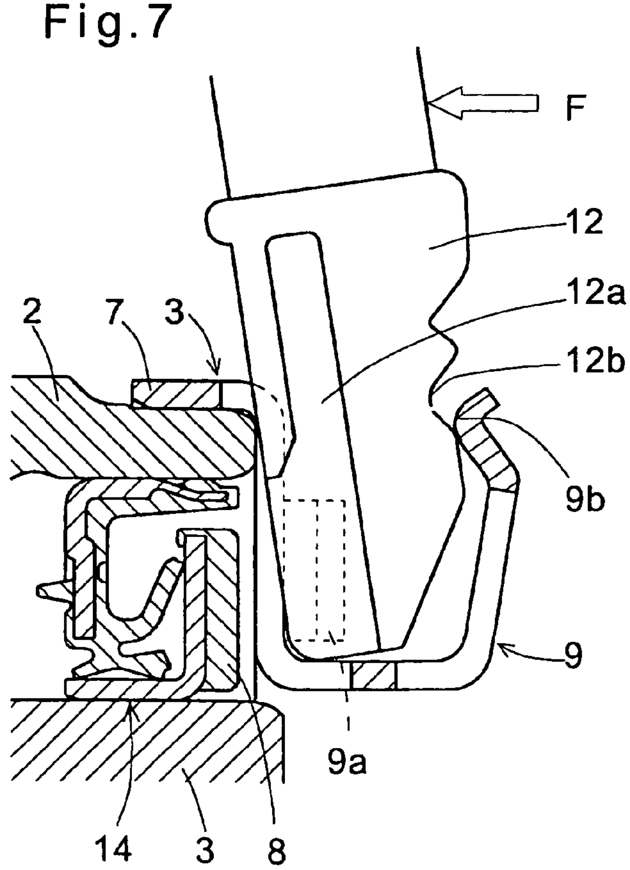
FIG. 7 is a front view in vertical section of the pocket of FIG. 6, showing how the sensor is inclined in the pocket when pushed backward at its upper portion.

FIGS. 5A and 5B show the third embodiment, in which the pocket 9 has a bottom frame similar to the bottom frame 9*d* of the first embodiment but further including a spring piece 9*f* adapted to push the bottom end of the front side of the sensor head backwardly when the sensor head is fully inserted in the pocket. The spring piece 9*f* elastically keeps the sensor 12 from inclining backwardly even if the sensor 12 is pushed backwardly at its upper portion.

While not shown, the concept of the present invention is applicable to a bearing assembly of which the outer member is rotatable and the inner member is stationary.

What is claimed is:

1. A bearing assembly comprising an outer member formed with two raceways on its inner periphery, an inner member formed with two raceways each radially opposing one of said raceways formed on said outer member, two rows of rolling elements, each row of said rolling elements being disposed between one of the two pairs of radially opposed raceways, and a rotational speed sensor unit, one of said outer member and said inner member being a stationary member and the other of said outer member and said inner member being a rotary member, said rotational speed sensor unit comprising a pulse generator mounted on said rotary member, a sensor holder having a pocket and mounted on said stationary member at one end thereof, and a sensor received in said pocket of said sensor holder, said sensor having a backside facing said pulse generator and said one end of said stationary member, and a front side, said pocket of said sensor holder including a clip portion that pushes a central portion of said front side of said sensor, thereby pressing said backside of said sensor against said one end of said stationary member, said pocket of said sensor holder further including a sensor inclination preventive arrangement that abuts a bottom end of said front side of said sensor when said sensor is fully inserted in said pocket, thereby preventing said sensor from inclining in such a direction that its top end pivots in the direction of said backside of said sensor.

2. The bearing assembly of claim 1 wherein said sensor inclination preventive arrangement comprises a bottom frame provided at a bottom portion of said pocket of said sensor holder, said bottom frame being configured to abut the bottom end of said front side of said sensor when said sensor is fully inserted in said pocket of said sensor holder.

3. The bearing assembly of claim 1 wherein said sensor inclination preventive arrangement comprises a front wall of said pocket of said sensor holder, said front wall has a bottom edge configured to abut the bottom end of said front side of said sensor when said sensor is fully inserted in said pocket.

* * * * *